United States Patent
Arduini et al.

(10) Patent No.: US 11,239,689 B2
(45) Date of Patent: Feb. 1, 2022

(54) METHOD AND APPARATUS FOR EFFICIENT POWER DELIVERY IN POWER SUPPLY SYSTEM

(71) Applicant: CISCO TECHNOLOGY, INC., San Jose, CA (US)

(72) Inventors: Douglas Paul Arduini, San Ramon, CA (US); Sung Kee Baek, San Ramon, CA (US); Jonathan Lee Smith, San Jose, CA (US); Joel Richard Goergen, Soulsbyville, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/109,007

(22) Filed: Dec. 1, 2020

(65) Prior Publication Data

US 2021/0408822 A1 Dec. 30, 2021

Related U.S. Application Data

(60) Provisional application No. 63/046,082, filed on Jun. 30, 2020.

(51) Int. Cl.
*H02J 9/00* (2006.01)
*H02J 4/00* (2006.01)

(52) U.S. Cl.
CPC .............. *H02J 9/005* (2013.01); *H02J 4/00* (2013.01); *H02J 2310/60* (2020.01)

(58) Field of Classification Search
CPC .......... H02J 9/005; H02J 4/00; H02J 2310/60
See application file for complete search history.

(56) References Cited

U.S. PATENT DOCUMENTS

| | | | | |
|---|---|---|---|---|
| 5,675,480 A | * | 10/1997 | Stanford | ................. H02J 1/001 307/58 |
| 9,880,574 B2 | * | 1/2018 | Morroni | .................... G06F 1/26 |
| 2003/0080624 A1 | | 5/2003 | Belson | |
| 2011/0191618 A1 | * | 8/2011 | Berke | ....................... G06F 1/28 713/340 |
| 2015/0012151 A1 | | 1/2015 | Park | |
| 2016/0011650 A1 | | 1/2016 | Yang | |
| 2017/0099047 A1 | | 4/2017 | Hsiao | |

FOREIGN PATENT DOCUMENTS

CN 111247712 A 9/2017

* cited by examiner

*Primary Examiner* — Daniel Cavallari

(57) ABSTRACT

In one embodiment, an apparatus includes a power supply operable to output power to a load along with at least one other power supply, a sensing component for identifying a load level, and a control component for switching the power supply from a full power mode to a power saving mode based on the identified load level. The power supply shares current with the other power supply at a lower current and generally the same voltage as the other power supply while in the power saving mode.

20 Claims, 5 Drawing Sheets

METHOD AND APPARATUS FOR EFFICIENT POWER DELIVERY IN POWER SUPPLY SYSTEM

STATEMENT OF RELATED APPLICATION

The present application claims priority from U.S. Provisional Application No. 63/046,082 entitled POWER SHEDDING AND POWER SAVING FOR POWER SUPPLIES, filed on Jun. 30, 2020, the contents of which are incorporated herein in its entirety.

TECHNICAL FIELD

The present disclosure relates generally to power systems, and more particularly, to efficient power delivery in a power supply system.

BACKGROUND

Companies are pursuing energy savings and cost savings in today's world of attention to power usage, power generation, carbon footprint, and green energy. Product efficiency is now a commodity and a competitive product feature. Network equipment and data centers are growing in power usage every year. Power supplies operating in network equipment are often operating at low load conditions where the power supply efficiency and power factor are often poor. Any innovations in power savings and efficiency improvements may result in a competitive advantage and a faster return on investment.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
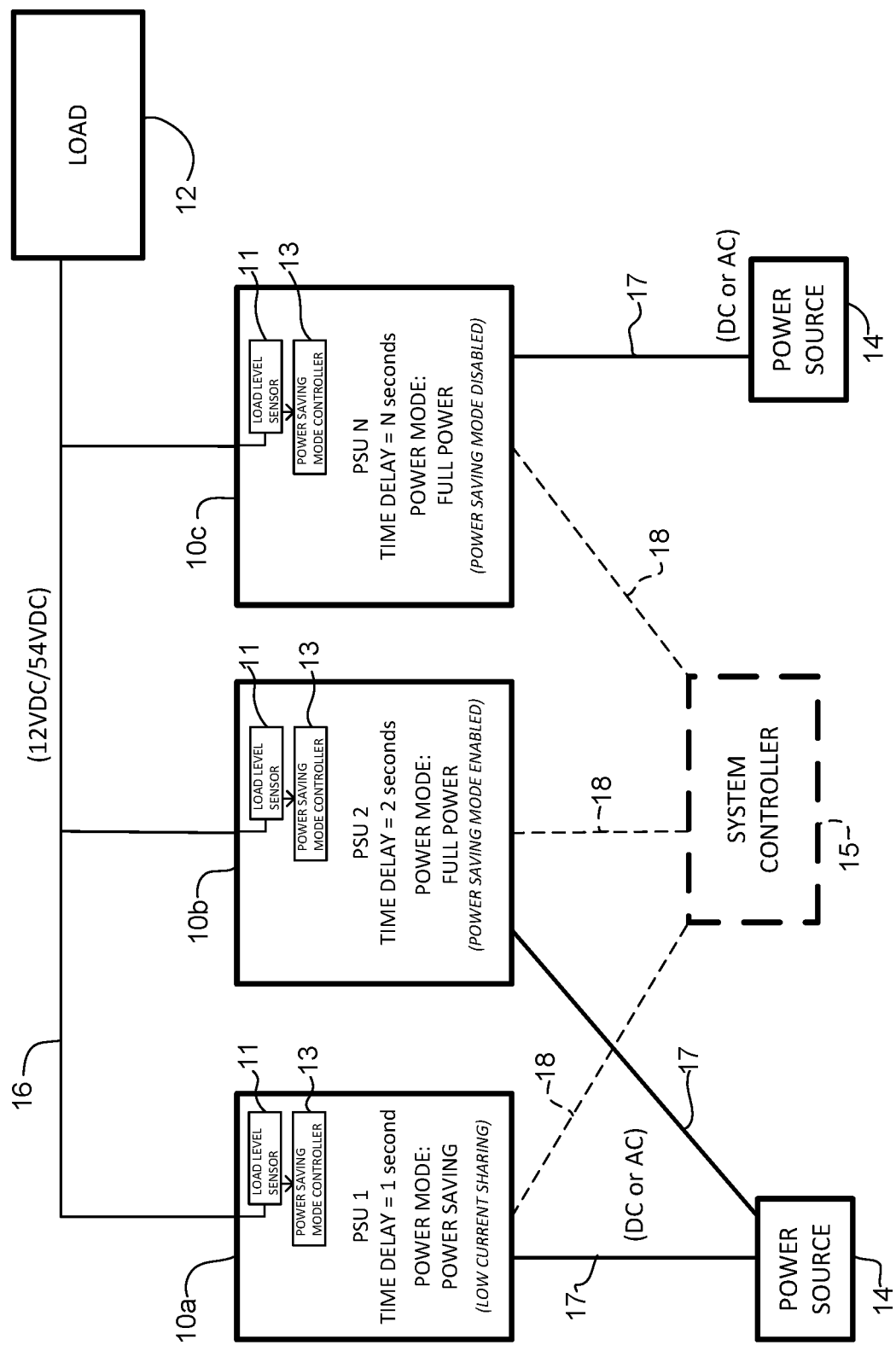
FIG. 1 illustrates a plurality of power supplies configured for efficient power delivery in a power supply system, in accordance with one embodiment.

In one embodiment, an apparatus generally comprises a power supply operable to output power to a load along with at least one other power supply, a sensing component for identifying a load level, and a control component for switching the power supply from a full power mode to a power saving mode based on the identified load level. The power supply shares current with the other power supply at a lower current and generally a same voltage as the other power supply while in the power saving mode.

In one embodiment, a system generally comprises a plurality of power supplies electrically coupled in parallel to output electrical power to a load, wherein at least one of the power supplies operates in full power mode and remaining power supplies are operable to switch between the full power mode and a power saving mode based on an identified load level. Each of the power supplies is configured with a different time delay for entering into the power saving mode when the identified load level falls below a specified threshold.

In yet another embodiment, a method generally comprises identifying a time delay at a power supply for switching from a full power mode to a power saving mode, wherein the time delay is different than a time delay associated with another power supply in a power system providing power to a load, determining at the power supply that a load level in the power system has dropped below a first threshold, switching from the full power mode to the power saving mode after the time delay, determining at the power supply, that the load level has exceeded a second threshold, and switching from the power saving mode to the full power mode.

Further understanding of the features and advantages of the embodiments described herein may be realized by reference to the remaining portions of the specification and the attached drawings.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Power supplies operating in network equipment within a data center are often operating at low load conditions where the power supply efficiency and power factor are often poor. FEP (Front-End Power) supplies sharing power in equipment and systems often waste power and generate wasted heat due to operation at low efficiency levels. For example, conventional power supplies (FEP supplies, PSUs (Power Supply Units)) in data centers typically operate around 12-25% of full load for long period of time. The power supply's optimum efficiency is generally around 50% of full load with much lower efficiency at light load conditions below 30% of full load, as described below with respect to FIG. 2. An example of a typical system with N+N redundancy is configured to operate at 50% of full load power capability with a system maximum load of 75%, resulting in an actual power supply maximum load of 37.5%. However, the actual average system load is much lower than the system maximum, where the power supplies are operating at about 12-25% of full load much of the time at low efficiency and wasted power plus wasted heat that needs additional wasted power to cool.

One method for shedding input power supplies to increase the load and efficiency of other supplies is the use of cold redundancy in which one power supply is assigned a primary role and the other power supplies are assigned a secondary role by a system controller. One or more secondary power supplies may be put into a sleep mode in which the power supply is inactive with no output current or current sharing. Since the power supply is inactive during sleep mode (typically using the ORing-FET (e.g., a MOSFET transistor as a synchronous rectifier ORing-diode) to switch off current), time is required to wake the power supply and bring up the output voltage. Drawbacks with cold redundancy also includes, for example, limited power supplies in a system, need for a cold redundancy pin for control between power supplies, need for software to assign a primary or secondary role to the power supply and make sleep/wake decisions, slow current sharing recovery, and risk of multiple power supplies turning off at the same time or too quickly. Cold redundancy may require additional time for a power supply to wake-up from a fault event, raise output voltage to charge a capacitor to the output voltage, and then start regulating current to the load. This method may also create a larger output voltage swing or transient. Another disadvantage of this method is that with output voltages higher than 12V the ORing-FET switch may not prevent inadvertent current sharing and the ORing-FET may be damaged. There is, therefore, a need for an improved method and apparatus for higher efficiency power supplies at low load conditions to save wasted power, wasted heat, and reduce cooling needs, while overcoming some of the drawbacks noted above.

The embodiments described herein provide a method, apparatus, and system for raising (optimizing) the efficiency and power factor of multiple power supplies operating at light loads in network equipment such as routers, switches, servers, or any other network device. As described in detail below, power supplies in a power supply system may be configured with one or more power saving (power shedding) and efficiency optimization features for low-load conditions that provide improved reliability and stability, faster mode changes, and reduced complexity. For example, in one or more embodiments the power system may use a low current sharing mode of operation of one or more power supplies during a low load condition at low efficiency and power factor to force other power supplies that were also at low load and power factor to increase their load to a higher efficiency and power factor operating range for significant energy savings. One or more embodiments may be configured with sequenced time delays to prevent multiple power supplies from changing operating modes at the same time and may provide unconditional hysteresis power levels, thereby preventing possible hysteretic mode change oscillation and instability. One or more embodiments may provide fast and reliable mode changes to full power following a fault, line-loss, or increased load event. One or more embodiments may be implemented with at least one power supply disabled for power saving mode operation to prevent inadvertent system power loss under certain conditions. One or more embodiments may allow all power supplies to be enabled by default without any system control with ID-pins that set different time delays and have multiple power modules with independent input lower feeds that keep at least one module disabled from power saving mode to prevent inadvertent system power loss under certain conditions. One or more embodiments may not use the low current sharing method but use the ORing-FET as an isolation switch for current turn-OFF, but will regulate the power supply capacitor voltage before the ORing-FET to follow the output voltage from the other power supplies after the ORing-FET so that it can quickly switch to the full current sharing without charging the capacitor to the output and with minimum output transient risk or a risk of ORing-FET damage at any output voltage operation. The embodiments described herein may be used in various types of power supplies and power delivery systems (power supply systems, power systems) operating at any output voltage (e.g., 12 VDC (Volts Direct Current), 54 VDC, or other voltage).

Referring now to the drawing, and first to FIG. 1, a power delivery system is shown, in accordance with one embodiment. The system comprises a plurality of power supplies 10a, 10b, 10c (power supply devices, power supply units, FEP supplies) electrically coupled in parallel to output electrical power to a load 12 with at least one of the power supplies (e.g., PSU N in FIG. 1, one input section of dual-input power supply (not shown)) operating in full power mode and remaining power supplies (PSU 1, PSU 2 in FIG. 1) operable to switch between the full power mode (normal operating mode) and a power saving mode (idle mode) based on an identified load level. As described below, the identified load level may comprise a percentage of full load and may be identified by sensing forced current share ratio, droop current share ratio, or current output ratio of full load at the power supply.

The power delivery system may include any number of power supplies, which may receive power from one or more power sources 14. In the example shown in FIG. 1, one power source 14 provides power to PSU 1 and PSU 2 and another power source provides power to PSU N. It is to be understood that the arrangement shown in FIG. 1 is only an example and the system may include any number of power supplies with any number of power sources 14 (e.g., one power source supplying power to all power supplies, N power sources supplying power to N power supplies, or any other arrangement). The power source 14 may provide DC (direct current) or AC (alternating current) to the power supplies 10a, 10b, 10c, over power lines 17 and each power supply may comprise a power converter (e.g., DC/DC converter, AC/DC converter) along with other suitable electronics and circuits, as is well known by those skilled in the art.

The power supplies 10a, 10b, 10c are electrically connected in parallel to output power to the load 12 over power line 16. The power supplies 10a, 10b, 10c may be configured to provide power to the load 12 at any suitable voltage level (e.g., 12 VDC, 54 VDC). The load 12 may comprise one or more electrical or electronic components at a network device, for example. In order to prevent the power supplies 10a, 10b, 10c from providing more power capacity than needed by the load 12, one or more power supplies (e.g., PSU 1 in FIG. 1) may switch to the power saving mode to optimize efficiency of the power supply system.

In one or more embodiments, an apparatus comprises the power supply (e.g., PSU 1 in FIG. 1) operable to output power to the load 12 along with at least one other power supply (e.g., PSU N in FIG. 1), a sensing component (load sense) 11 for identifying a load level (e.g., on line 16 in FIG. 1), and a control component (power saving mode controller) 13 for switching the power supply from the full power mode (normal operation) to the power saving mode (idle mode) based on the identified load level to optimize efficiency in the power system. As described below with respect to FIG. 3, the power supply 10a shares current with the other power supply (or power supplies) 10b, 10c at a lower current and generally the same voltage as the other power supply while in the power saving mode.

In one or more embodiments, the power supply system may include an optional controller 15 (system controller, host) to control switching of the power supplies between modes, change default mode level settings, assign power supply location numbers used in variable delay times, and the like. The controller 15 may communicate over data communication lines (common interface bus) 18 using PMBus (Power Management Bus), I²C (Inter-Integrated Circuit), SMBus (System Management Bus), or any other suitable data communication protocol. In one example, power supply mode decisions may be made by load level sensing of $I_{share}$ pin levels (bus signal used by power supply) with active sharing or output bus voltage sensing with droop sharing current sensing and fast load step changes.

In one or more embodiments, system control may be replaced with local control at each of the power supplies. For example, the power supply may be configured with internal control (software, logic, firmware) that allows each power supply to operate independently from the other power supplies in making a decision to switch between full power mode and power saving mode. The local control may eliminate the need for power supply interface (control) pins and complex software or firmware system control algorithms and programming. Mode decisions may be made at each power supply by an internal control system (power saving mode controller 13) with no need for a command pin, no need for a disabled power saving mode power supply, and no need for active system control (e.g., at controller 15).

As previously noted, each power supply may operate in full power mode (normal operation) or power saving mode (optimized efficiency operation). In one or more embodiments, power saving mode is disabled on at least one power supply. In the example shown in FIG. 1, PSU 1 is operating in power saving mode (low current sharing), PSU 2 is operating in full power mode with power saving mode enabled, and PSU N is operating in full power mode with power saving mode disabled. At least one power supply in the system, or one input section in dual-input power supply, is not enabled for power saving mode to prevent inadvertent system power loss under certain (corner) conditions.

In one or more embodiments, the power supplies share current in all modes but switch to a low current sharing mode of operation in power saving mode. For example, PSU 1 in FIG. 1 is in a low current sharing mode while in power saving mode, which allows for fast recovery and switching between modes with dynamic load changes. As described below, power saving mode uses very low current sharing while shedding power to raise (optimize) efficiency of the remaining power supplies at full power mode. The low current sharing power saving mode operates with less voltage transient during the change from power saving mode to full power mode with an increase system load, line loss, or power supply failure. While in the low current sharing power saving mode, power supply output voltage remains generally at (near) the output power bus voltage (e.g., ORing FET on at all times). The power supply remains in a current sharing mode of operation but at a lower current when in power saving mode. Since the power supply is continuously active and supplying voltage and current to the load, it can quickly change the current sharing ratio from a low percentage of normal current to full current.

With internal power supply control, power-up state may be decided by current level (identified load) with either forced current sharing or fast droop current sharing output voltage without the need for an external pin. The low current sharing power saving mode allows for operation at any output voltage (e.g., 12 VDC, 54 VDC) without risk of damage to the ORing FET, which does not operate as a switch during mode changes. Low current sharing power saving mode operation may be configured as enabled by default or user selected.

In one or more embodiments, each of the power supplies 10a, 10b, 10c is configured with a different time delay for entering into the power saving mode upon an identified load level falling below a specified threshold. A time delay component (e.g., logic, software, device, mechanism) delays a time between the sensing component (load sense) 11 identifying the load level dropping below the specified threshold and the control component 13 switching the power supply from the full power mode to the power saving mode. Each power supply 10a, 10b, 10c is associated with (assigned, configured with) a different time delay (time period) so that the time delay at one of the power supplies is different than a time delay at the other power supplies in the power system. In a system configured for individual power supply control, each power supply 10a, 10b, 10c may comprise an identifier (ID) and corresponding time delay (e.g., 1, 2, . . . N). The ID may be preprogrammed into the power supply (e.g., ID pins set number for PSU control). The time delay may be set at a default of one second per ID number, a number of seconds may be assigned for each ID number, or any other suitable time delay may be associated with the ID number. In a power supply system configured for system control, the controller 15 may assign a time delay (e.g., number of seconds) for each power supply. The use of different time delays prevents multiple power supplies from entering power saving mode at the same time, thereby providing stable operation during and after mode changes. The sequenced time delay allows for any quantity of power supplies (N−1 or N+N) in the system to enter power saving mode at a fixed current level and provides improved reliability and reduced complexity as compared to systems with assigned primary and secondary power supplies. The sequential time delay of power shedding also reduces the possibility of oscillation between modes and allows for higher resolution with quantity granularity for any number of power supplies greater than one. For example, the sequenced (staggered) time delays allow the power supplies to gradually and sequentially enter the power saving mode between time delays while the load level is below 30% until the load level is above 30%. This prevents all of the power supplies from going into the power saving mode at one time and then increasing the load too much into over-current and causing a system shutdown of power or instability with cycling between modes.

The power supplies may enter power saving mode at a specified load level (threshold), which may be sensed, for example, by forced current share ratio, droop current share ratio, or current output ratio of full load. The power supply switches from the power saving mode to the full power mode when the identified load level exceeds a second threshold. The power supplies may be default configured, for example, to enter power saving mode at less than 30% of full load and exit power saving mode at greater than 75% of full load. If the power system is configured for system control, the controller 15 may assign a different percent of load level (specified threshold) for entering or exiting power saving mode. The controller 15 may, for example, use PSU PMBus (or other data communications protocol) current and power readings to make mode change decisions.

The power supplies 10a, 10b, 10c may be configured to switch from power saving mode to full power mode upon identifying any power supply alarm or fault, any input power loss, interrupt pin status, or output voltage dip below a specified level. The system controller 15 may disable the power supplies' enable status of any or all input channels upon sensing a failure, fault, alarm, or voltage drop.

Figure 2:
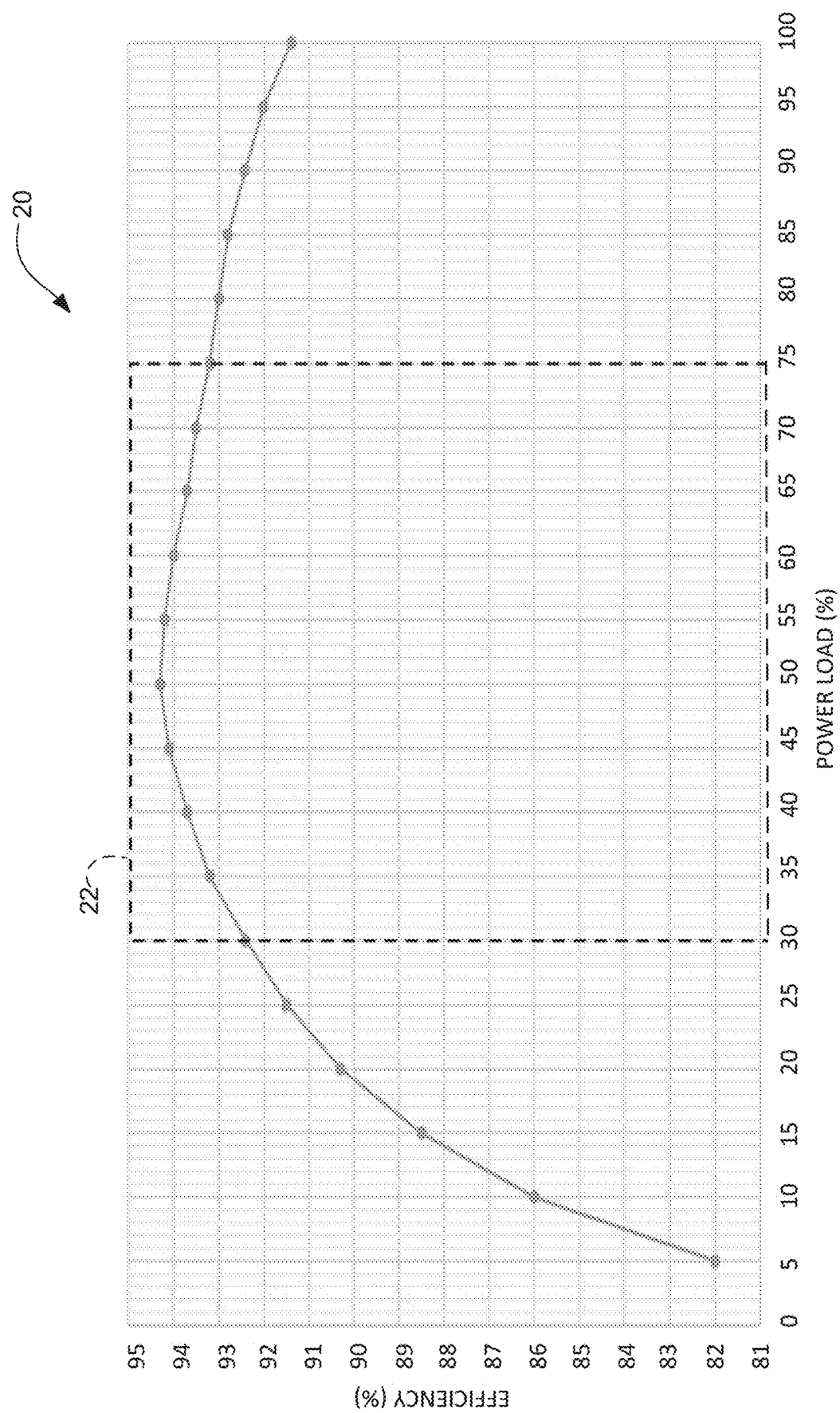
FIG. 2 is a graph of efficiency versus power load illustrating an example of target conditions for the power supply system of FIG. 1.

FIG. 2 shows a graph, generally indicated at 20, illustrating percentage of power supply efficiency based on percentage of load for various types of power supplies. As shown in the graph 20, efficiency generally drops off below 30% power level. The load percentage refers to a percentage of full load operation. In one embodiment, the system is configured such that the power supply goes into the power saving mode with power load below 30% and exits power saving mode with power load above 75%. This efficiency "sweet spot" is identified at 22. In one example, conventional power supplies may operate at 12-25% load with 87.0-91.5% efficiency, but the power supply sweet spot at 30-75% load with 92.4-93.2% efficiency. With four power supplies in a system at 12% load with 87.0% and three power supplies put into the power saving mode described herein, the remaining power supply will be at 48% load and about 94.2% efficiency. This will change the power losses from 13.0% to 5.8% with about 224% savings in wasted power, in one example shown in FIG. 2. As previously described, the three power supplies operating in power saving mode share a trickle amount of current (low current sharing) but are alive and regulating at the same output voltage as the power supply operating in full power mode so that they can recover to full power current sharing very quickly. The power saving mode sharing trickle current sharing level power losses are ignored in this example as insignificant even with poor efficiency and power factor. It is to be understood that this is only an example and power savings may be different with different types of power supplies or settings.

In one example, the power delivery system may use a reduced current sharing method to shed power when the load level is below 30% and then recover at a load level above 75% to full power mode (normal current sharing). The power saving mode power supplies force the other power supplies to operate at high efficiency (sweet spot 22 in FIG. 2) and power factor levels between 30-75% load when the total load was low enough for the power supplies to be operating at <30% load with very low efficiency and power factor so that power dissipation and heat that would have been wasted can be saved. As described below with respect to FIG. 3, power saving mode may operate, for example, with 1/16 of normal current sharing, where the power and losses are insignificant even with poor efficiency and power factor.

It is to be understood that the efficiency versus load graph and sweet spot between 30% and 75% shown in FIG. 2 is only an example and different power load percentages may be used for entering and exiting power saving mode based on the power system configuration (e.g., number or type of power supplies) or other factors.

Figure 3:
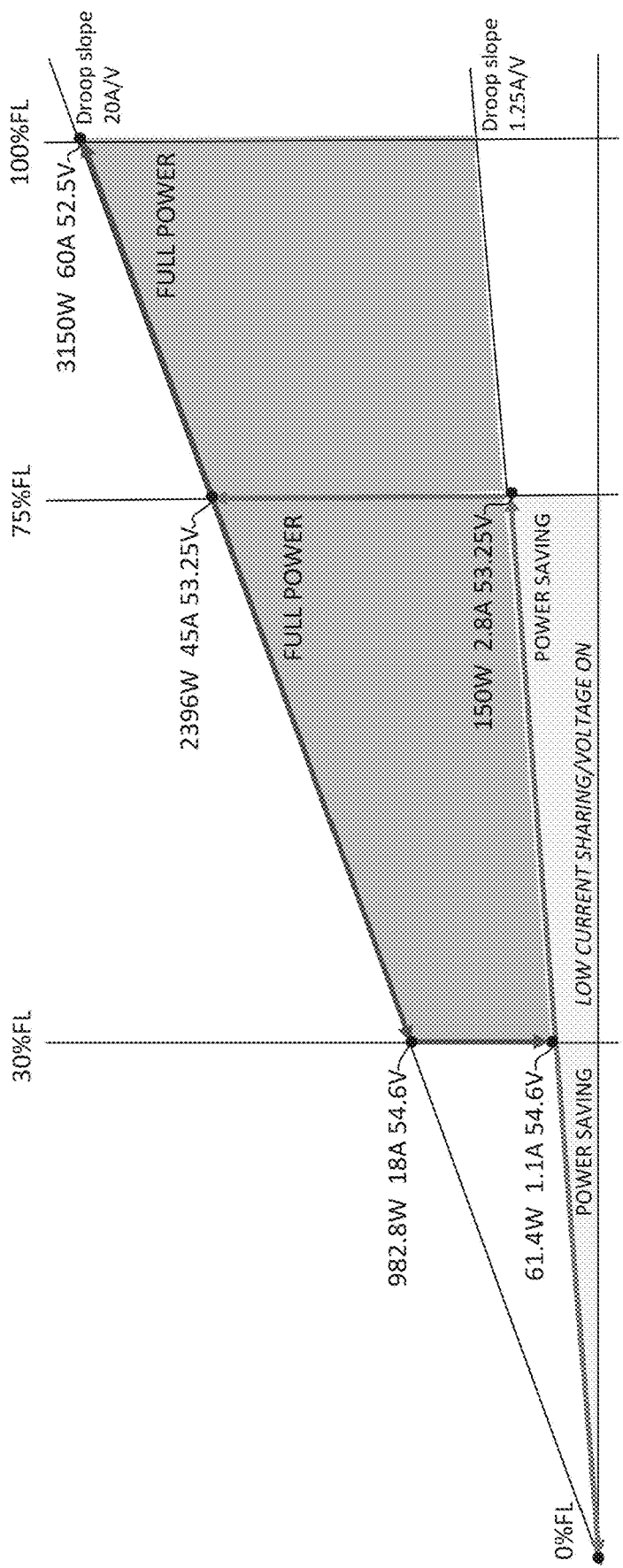
FIG. 3 illustrates power saving mode and full power mode operation for one of the power supplies in FIG. 1.

FIG. 3 illustrates one example of power saving mode operation with 1/16 (6.25%) of full power mode current regulation, or 93.75% reduction in current from full power mode. The example illustrated in FIG. 3 shows examples of operating points for each input module (power supply). As previously described, the power supply may enter power saving mode at <30% full load. This provides a reduction in power and current to 6.25% of the 30% power level (e.g., from 982.8 W to 61.4 W, and from 18 A to 1.1 A) with the voltage level remaining at 54.6V (with droop sharing slope of 54V+/−1.5V (0/100% load). The power supply remains in power saving mode until the load reaches 75% of full load, as indicated in FIG. 3. FIG. 3 also shows an example of droop slope for power saving mode (1.25 A (amps)/V (volts)) and full power mode (20 A/V). It is to be understood that the power, current, and voltage levels shown in FIG. 3 are only examples and other power, voltage, or current levels and percent load for switching operating modes may be used. Also, the reduction to 6.25% of current shown in FIG. 3 is only an example and other values may be used. For example, the low current sharing may be 10% or less of the full power mode current.

Figure 4:
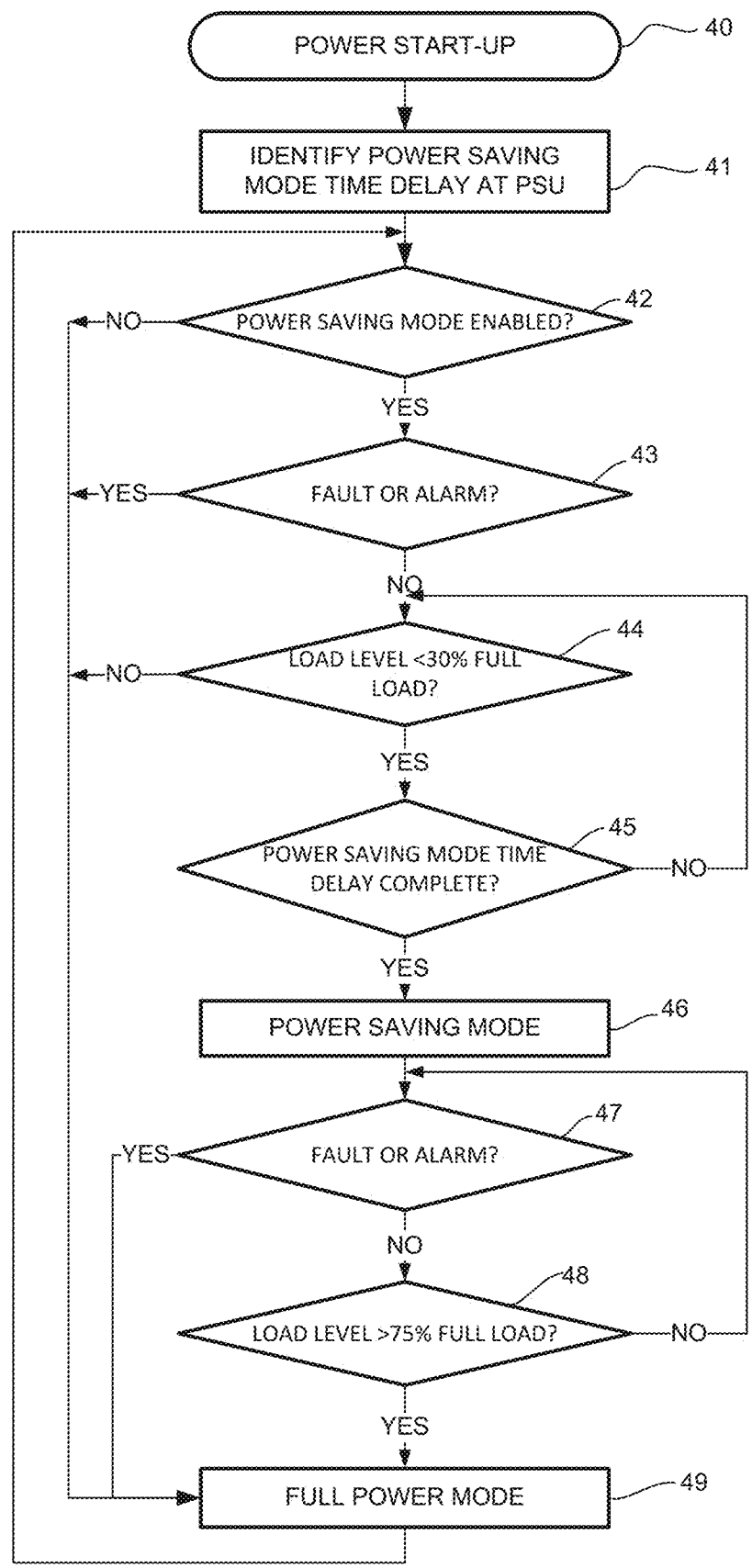
FIG. 4 is a flowchart illustrating an overview of a process for efficient power delivery at one of the power supplies in FIG. 1, in accordance with one embodiment.

FIG. 4 is a flowchart illustrating an overview of a process for efficient power delivery at a power supply, in accordance with one embodiment. The process begins at power start-up (step 40). The power supply identifies its associated (assigned, configured) time delay for entering the power saving mode (step 41). As previously described, the time delay may be based on a PSU ID number or may be assigned by a controller and is different than time delays assigned to other power supplies in the power system providing power to the load. Identifying the time delay may, therefore, comprise receiving an assigned time delay or setting a time delay based on a power supply ID number, for example. Sequencing of time delays across the power supplies in the power system prevents multiple power supplies from entering power saving mode at the same time, thereby providing stable operation between modes.

The power supply first determines if power saving mode is enabled (step 42). If power saving mode is disabled, the power supply operates in full power mode (step 49). The power supply may also check for any faults or alarms (e.g., PSU alarm or fault, input power loss, interrupt pin status, or output voltage dip below a set level) (step 43). If any faults are present at the PSU or another PSU in the power supply system, the power supply operates in full power mode (steps 43 and 49). If no faults are present, the power supply determines if the load level in the power system has dropped below a first threshold (e.g., current sharing <30% full load) (step 44). The threshold value may represent, for example, an output voltage value, droop current share level, forced current share level, current output ratio or level, or may be based on an $I_{share}$ pin value at the power supply. If the power saving mode time delay is complete (step 45), the power supply operates in power saving mode (step 46). As previously described, the power supply may share current at a lower current and generally same voltage as the other power supplies while in power saving mode to allow for fast switching from power saving mode to full power mode.

If any faults or alarms appear, the power supply switches to full power mode (steps 47 and 49). If no faults or alarms occur, but the load level exceeds a second threshold (e.g., 75% of full load) (step 48) the power supply switches to full power mode (step 49). Once the power supply is operating in full power mode, the power supply continues to monitor the load level (as long as the power saving mode is enabled at the power supply) and switches to power saving mode if the load level falls below 30% and stays below 75% until the end of the time delay (steps 44, 45, and 46).

It is to be understood that the process shown in FIG. 4 is only an example and that steps may be modified, added, removed, or combined, without departing from the scope of the embodiments. For example, the first threshold of <30% full load and second threshold of >75% full load are only examples and other thresholds may be used.

Figure 5:
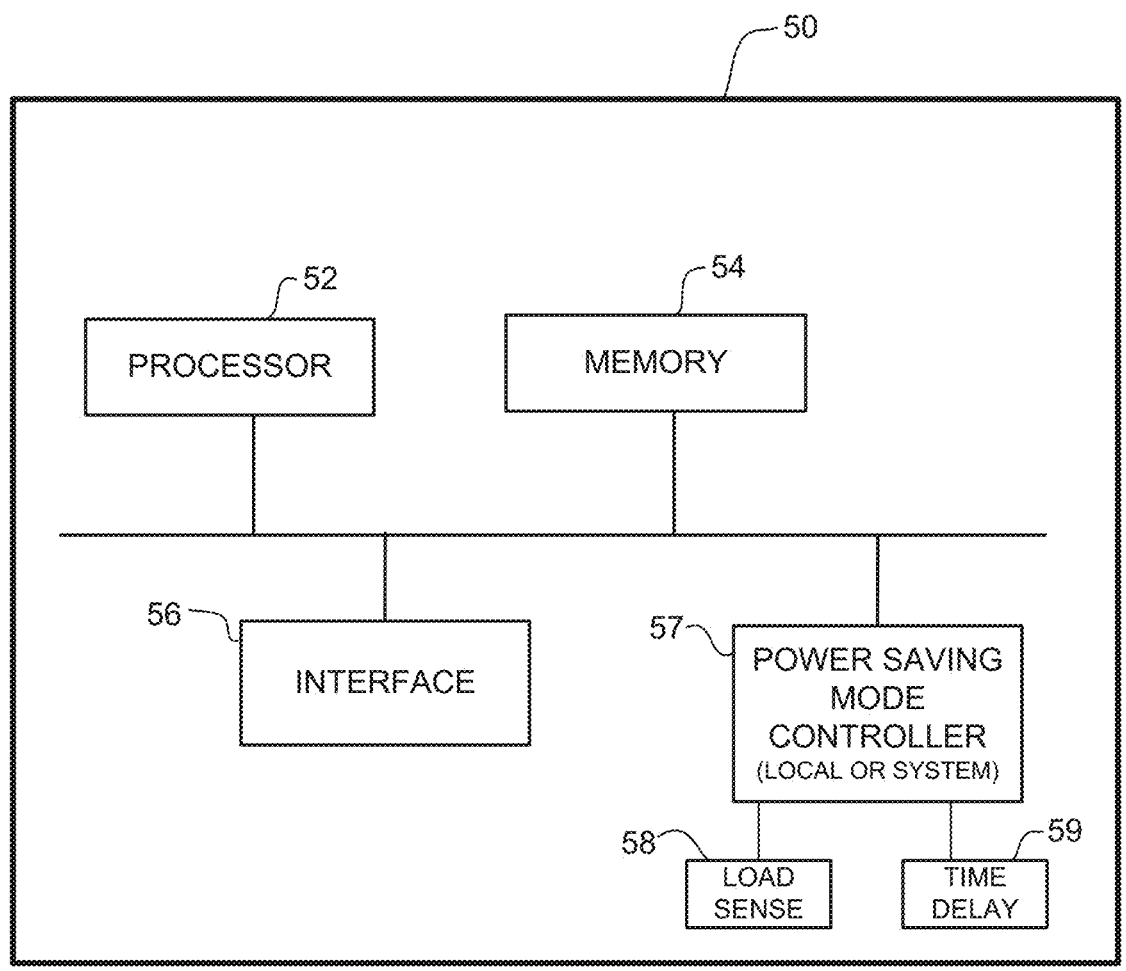
FIG. 5 is a block diagram depicting an example of a network device in which the embodiments described herein may be implemented.

FIG. 5 illustrates an example of a network device 50 (e.g., switch, router, server, and the like) that may implement one or more embodiments described herein. In one or more embodiments, the network device is a programmable machine that may be implemented in hardware, software, or any combination thereof. The network device includes one or more processor 52, memory 54, interface 56, and power saving mode controller 57.

Memory 54 may be a volatile memory or non-volatile storage, which stores various applications, operating systems, modules, and data for execution and use by the processor. The network device 50 may include any number of memory components.

Logic may be encoded in one or more tangible media for execution by the processor 52. For example, the processor 52 may execute codes stored in a computer-readable medium such as memory 54. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 50 may include any number of processors 52. In one or more embodiments, the processor 52 may be operable to perform the steps shown in the flowchart of FIG. 4.

The interface 56 may comprise any number of interfaces (line cards, ports) for receiving data or transmitting data to other devices, or receiving or delivering power.

As described above with respect to FIG. 1, a system controller may provide control functions or individual power supplies may provide control functions of power saving mode controller 57. For example, the controller 57 may comprise power supply internal automatic software control or local power supply firmware control with no need for power supply interface pins. The controller 57 may receive input from a load sense device 58 and a time delay (time delay component, software, logic, firmware) 59.

It is to be understood that the network device 50 shown in FIG. 5 and described above is only an example and that different configurations of network devices may be used. For example, the network device may further include any suitable combination of hardware, software, algorithms, processors, devices, components, or elements operable to facilitate the capabilities described herein.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A power supply system comprising:
a first power supply operable to output power to a load; and
a second power supply electrically coupled in parallel with said first power supply to output electrical power to the load over a power line along with said first power supply;
said first power supply comprising:
a load level sensor operable to identify a load level at the power line below a specified threshold; and
power saving mode controller for receiving input from the load level sensor and switching said first power supply from a full power mode to a power saving mode based on said identified load level, wherein said second power supply operates in the full power mode with the power saving mode disabled;
wherein said first power supply shares current with said second power supply at a lower current and a same voltage as said second power supply while in said power saving mode to optimize efficiency of the power supply system.

2. The power supply system of claim 1 wherein said first power supply further comprises a time delay device operable to delay a time between the load level sensor identifying said load level falling below said specified threshold and the power saving mode controller switching said first power supply from said full power mode to said power saving mode.

3. The power supply system of claim 2 wherein another power supply comprises the time delay device configured with a time delay different than a time delay of the time delay device of said first power supply to prevent said another power supply in the power supply system from switching from said full power mode to said power saving mode at a same time as said first power supply.

4. The power supply system of claim 2 wherein the delay of time between the load level sensor identifying said load level falling below said specified threshold and the power saving mode controller switching said first power supply from said full power mode to said power saving mode is based on an identifier number associated with said first power supply.

5. The power supply system of claim 1 wherein said specified threshold comprises one of a forced current share ratio, droop current share ratio, current output ratio, other power supply output voltage, or an abnormal operation condition or fault in the power supply system.

6. The power supply system of claim 1 wherein said first power supply is configured to switch from said power saving mode to said full power mode when said identified load level exceeds a second threshold.

7. The power supply system of claim 6 wherein said specified threshold comprises approximately 30% of a full load and said second threshold comprises approximately 75% of said full load.

8. The power supply system of claim 1 wherein said lower current comprises 10% or less of a full load operating current.

9. The power supply system of claim 1 wherein the load level sensor is configured to identify a bus signal at the power supply and provide input to the power saving mode controller for use by the power saving mode controller in switching said first power supply between said full power mode and said power saving mode.

10. A system comprising:
a plurality of power supplies electrically coupled in parallel to output electrical power to a load, wherein at least one of the power supplies operates in full power mode and remaining power supplies are operable to switch between said full power mode and a power saving mode based on an identified load level, each of the power supplies comprising:
a load level sensor operable to identify a load level at a power line connected to the load;
a power saving mode controller for receiving input from the load level sensor and switching a power supply from said full power mode to said power saving mode based on said identified load level, wherein said power saving mode is disabled on said at least one of the power supplies; and
a time delay device operable to delay a time between the load level sensor identifying said load level falling below a specified threshold and the power saving mode controller switching the power supply from said full power mode to said power saving mode to prevent more than one of the power supplies switching from said full power mode to said power saving mode at a same time.

11. The system of claim 10 wherein said specified threshold comprises one of a forced current share ratio, droop current share ratio, current output ratio, other power supply output voltage, or an abnormal operation condition or fault in the system.

12. The system of claim 10 wherein each of said remaining power supplies is configured to switch from said power saving mode to said full power mode when said identified load level exceeds a second threshold.

13. The system of claim 12 wherein said specified threshold comprises approximately 30% of a full load and said second threshold comprises approximately 75% of said full load.

14. The system of claim 10 wherein each of the power supplies is configured to switch from said power saving mode to said full power mode upon identifying one of a power supply alarm, a power supply fault, an input power loss, an interrupt pin status, or an output voltage drop below a specified level.

15. The system of claim 10 further comprising a system controller operable to assign said time delay and said specified threshold to each of the power supplies.

16. The system of claim 10 wherein for each of the power supplies, said time delay is assigned based on an identifier associated with each of the power supplies.

17. A method comprising:
identifying a time delay at a power supply for switching from a full power mode to a power saving mode, wherein said time delay is different than a time delay associated with another power supply in a power system providing power to a load;
determining at the power supply, that a load level in the power system has dropped below a first threshold;
switching from said full power mode to said power saving mode after said time delay;
determining at the power supply, that said load level has exceeded a second threshold; and
switching from said power saving mode to said full power mode.

18. The method of claim 17 wherein the power supply shares current with said another power supply at a lower current and generally a same voltage at said another power supply while in said power saving mode.

19. The method of claim 17 further comprising disabling said power saving mode at one of a plurality of power supplies in the power system.

20. The method of claim 17 wherein the power supply is configured to switch to said power saving mode without sharing current with power supply output voltage isolated from another power supply output voltage and maintains an output voltage at a same output voltage of said another power supply.

* * * * *